(12) United States Patent
Weissman et al.

(10) Patent No.: US 6,795,690 B2
(45) Date of Patent: *Sep. 21, 2004

(54) FULL-DUPLEX TRANSCEIVER WITH DISTRIBUTED DUPLEXING FUNCTION

(75) Inventors: Haim Weissman, Haifa (IL); Eli Yonah, Binyamina (IL)

(73) Assignee: Qualcomm, Incorporated, San Diego, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/417,831

(22) Filed: Oct. 12, 1999

(65) Prior Publication Data

US 2003/0050018 A1 Mar. 13, 2003

(51) Int. Cl.[7] .............................. H04B 1/44; H03H 9/00; H03G 3/30; H03G 5/16; H03G 9/00
(52) U.S. Cl. ..................... 455/78; 333/193; 330/283; 330/133
(58) Field of Search ................ 455/82, 188.1, 455/78; 333/193; 330/283, 133

(56) References Cited

U.S. PATENT DOCUMENTS

| | | | |
|---|---|---|---|
| 4,672,605 A | * | 6/1987 | Hustig et al. |
| 4,792,939 A | | 12/1988 | Hikita et al. ............... 370/24 |
| 5,027,352 A | * | 6/1991 | Goode |
| 5,202,652 A | * | 4/1993 | Tabuchi et al. ............. 333/193 |
| 5,432,473 A | * | 7/1995 | Mattila et al. .............. 330/133 |
| 5,666,091 A | * | 9/1997 | Hikita et al. ................ 333/193 |
| 5,815,804 A | * | 9/1998 | Newell et al. ................. 455/78 |
| 5,854,579 A | * | 12/1998 | Penunuri .................... 333/193 |
| 5,929,707 A | * | 7/1999 | Samuels ..................... 330/283 |
| 6,215,988 B1 | * | 4/2001 | Matero .................... 455/188.1 |

FOREIGN PATENT DOCUMENTS

EP     0667685     8/1995     ............ H04B/1/52

* cited by examiner

*Primary Examiner*—William Cumming
(74) *Attorney, Agent, or Firm*—Philip Wadsworth; Sandip (Micky) Minha; Jae-Hee Choi

(57) ABSTRACT

A duplex radio transceiver, coupled to baseband circuitry and to an antenna, includes a receive chain, a transmit chain and a duplexer. The transmit chain includes filter components that attenuate signals originating from the transmit chain in a receive frequency band by a stop-band attenuation that is approximately equal to or greater than the stop-band attenuation of the duplexer in the receive band. Similarly, the receive chain includes filter components filter components that attenuate signals in a transmit frequency band by a stop-band attenuation that is approximately equal to or greater than the stop-band attenuation of the duplexer in the transmit band. A bias control circuit senses a power level associated with radio signals in the transmit chain and adjusts an amplifier in the receive chain responsive to the power level.

19 Claims, 3 Drawing Sheets

FULL-DUPLEX TRANSCEIVER WITH DISTRIBUTED DUPLEXING FUNCTION

FIELD OF THE INVENTION

The present invention relates generally to radio communication devices, and specifically to mobile radio transceivers.

BACKGROUND OF THE INVENTION

Miniature, full-duplex radio transceivers are used in many mobile communication devices, such as cellular telephones. Such a transceiver typically includes a transmit (Tx) chain and a receive (Rx) chain, sharing a common antenna. The transceiver must be carefully designed in order to maintain optimal performance of the receive chain even while transmitting at maximum output power. Care must be taken to avoid leakage into the Rx chain of Tx signals, which can cause Rx saturation, and of broadband noise from the Tx chain, particularly noise in the Rx frequency band, which tends to degrade the sensitivity of reception. This latter requirement is particularly important and difficult to implement when the Tx and Rx frequency bands are closely spaced, as is the case in cellular telephony.

FIG. 1 is a block diagram that schematically illustrates a full-duplex radio transceiver 20, as is known in the cellular art. The transceiver comprises a Tx chain 42 and an Rx chain 44, both coupled by a duplexer 30 to an antenna 32. In the Tx chain, an intermediate frequency (IF) signal generated by a baseband transmitter circuit 22 is converted to a suitable radio frequency (RF) by an up-converter 24. The resultant RF signal is filtered by a bandpass filter 26, amplified by a power amplifier 28, and passed by duplexer 30 to antenna 32 for transmission. Signals received by antenna 32 in the designated Rx band pass through duplexer 30 to a low-noise amplifier 34. The amplified signals are filtered by a bandpass filter 35, down-converted to IF by a down-converter 36 and then conveyed for processing to a baseband receiver circuit 38. Both up-converter 24 and down-converter 36 are driven by local oscillator circuits 40, as is known in the art.

Duplexer 30 performs both Tx filtering and Rx filtering. Tx filtering typically provides approximately 50 dB of stop-band attenuation in the Rx band, i.e., to strongly attenuate signals from extraneous sources in the Rx frequency band, particularly from Tx chain 42. Rx filtering similarly provides approximately 50 dB of stop-band attenuation in the Tx band, so that the Tx signals do not leak into and saturate the Rx chain. In the absence of such a duplexer, transceiver 20 could not give adequate Rx performance. To achieve such performance, duplexer 30 must generally comprise a number of cavity resonators, dielectric filters or helical filters. As a result, the duplexer is commonly the largest and most costly component in transceiver 20. A typical duplexer of this type is model S1-A9/NN1, produced by LK-Products Oy of Finland, which sells for about $20 and has dimensions of 40.5×25.0×6.8 mm.

U.S. Pat. No. 4,792,939, which is incorporated herein by reference, describes a duplex radio communication transceiver for a mobile telephone. The duplexer and filters in the transceiver are made of surface acoustic wave (SAW) filters instead of cavity elements. All circuits are mounted on a single metallic substrate and sealed by means of a metallic casing into a module, which according to the inventors, can be made much more compact than transceivers of earlier design. The patent does not describe the stop-band performance and noise characteristics of the SAW-based duplexer in any specific or quantitative way, however. In particular, it does not address the problems of leakage of Tx signals and of excessive noise into the Rx chain, which are likely to arise due to the inferiority of the SAW-based duplexer relative to full-performance duplexers.

SUMMARY OF THE INVENTION

It is an object of the present invention to provide an improved, compact, full-duplex radio transceiver.

It is a further object of some aspects of the present invention to provide a full-duplex radio transceiver having a reduced production cost and size.

In preferred embodiments of the present invention, a full-duplex radio transceiver comprises small, low-cost filter components arranged in Tx and Rx chains of the transceiver so as to attenuate Tx signals and noise from the Tx chain that would otherwise penetrate the Rx chain. The Tx and Rx chains are coupled to an antenna by a duplexer, which is preferably made of similar low-cost filter components. The total stop-band attenuation of the filter components in the Tx and Rx chains is approximately equal to or greater than the stop-band attenuation of the duplexer. In this respect, the present invention differs from transceivers known in the art, in which most or all of the required stop-band attenuation is provided by the duplexer. As a consequence, transceivers in accordance with the present invention can be made substantially smaller and less expensive than common transceivers using full-performance duplexers.

Preferably, the filter components that are arranged in the Tx and Rx chains and are used in making the duplexer comprise miniature surface acoustic wave (SAW) filters. Further preferably, the Tx and Rx chains both comprise multiple amplification stages of relatively low gain, rather than a single high-gain stage as in common transceivers. The SAW filters are inserted between the multiple stages to provide the required stop-band attenuation. Most preferably, the bias of at least one of the amplification stages in the Rx chain is controlled responsive to the Tx output power so as to avoid compression of the Rx gain even when the Tx power is high.

There is therefore provided, in accordance with a preferred embodiment of the present invention, a duplex radio transceiver, coupled to baseband circuitry and to an antenna, which includes:

a receive chain, which receives and processes radio signals in a receive frequency band and conveys the processed signals to the baseband circuitry, the chain including one or more amplifiers and one or more filter components;

a transmit chain, which generates radio signals for transmission in a transmit frequency band, the chain including one or more amplifiers and one or more filter components, which attenuate signals originating from the transmit chain in the receive frequency band by a first stop-band attenuation; and a duplexer, which couples the transmit chain and the receive chain to the antenna, and which attenuates signals originating from the transmit chain in the receive frequency band by a second stop-band attenuation, which is approximately equal to or less than the first stop-band attenuation.

Preferably, the duplexer and the one or more filter components in the receive and transmit chains include surface acoustic wave devices.

Preferably, the one or more amplifiers in the transmit chain include at least two amplifiers, with at least one of the filter components disposed therebetween. Most preferably, the transmit chain includes:
- a first filter, which receives and filters signals from an upconverter coupled to the baseband circuitry;
- a driver amplifier, which receives and amplifies the signals from the first filter;
- a second filter, which receives and filters the signals from the driver amplifier; and
- a power amplifier, which receives and amplifies the signals from the second filter, which amplified signals are conveyed to the duplexer.

In a preferred embodiment, the power amplifier has a gain approximately equal to or less than 20 dB.

Preferably, the transceiver includes a bias control circuit, which senses a power level associated with the radio signals for transmission and adjusts at least one of the amplifiers in the receive chain responsive to the power level.

Further preferably, the duplexer attenuates signals entering the receive chain in the transmit frequency band with a third stop-band attenuation, and the receive chain attenuates the signals in the transmit frequency band with a fourth stop-band attenuation approximately equal to or greater than the third stop-band attenuation.

There is also provided, in accordance with a preferred embodiment of the present invention, a duplex radio transceiver, coupled to baseband circuitry and to an antenna, which includes:
- a transmit chain, which generates radio signals for transmission in a transmit frequency band;
- a receive chain, which receives and processes radio signals in a receive frequency band and conveys the processed signals to the baseband circuitry, the chain including one or more amplifiers and one or more filter components which attenuate signals in the transmit frequency band by a first stop-band attenuation; and
- a duplexer, which couples the transmit chain and the receive chain to the antenna, and which attenuates signals entering the receive chain in the transmit frequency band by a second stop-band attenuation, which is approximately equal to or less than the first stop-band attenuation.

Preferably, the one or more amplifiers in the receive chain include at least two amplifiers, with at least one of the filter components disposed therebetween. Most preferably, the receive chain includes:
- a first low-noise amplifier, which receives and amplifies signals conveyed from the duplexer;
- a first filter, which receives and filters the signals from the first low-noise amplifier;
- a second low-noise amplifier, which receives and amplifies the signals from the first filter; and
- a second filter, which receives and filters the signals from the second low-noise amplifier.

In a preferred embodiment, the first low-noise amplifier has a gain approximately equal to or less than 10 dB.

There is moreover provided, in accordance with a preferred embodiment of the present invention, a method for transmitting and receiving radio signals in a full-duplex mode, including:
- receiving and processing radio signals in a receive frequency band using a receive chain;
- generating and transmitting radio signals for transmission in a transmit frequency band in a transmit chain;
- filtering the signals in the transmit chain so as to attenuate signals in the receive frequency band originating therefrom by a first stop-band attenuation; and
- coupling the transmit chain and the receive chain to an antenna using a duplexer, so as to attenuate signals originating from the transmit chain in the receive frequency band by a second stop-band attenuation, which is approximately equal to or less than the first stop-band attenuation.

Preferably, receiving and processing the radio signals includes sensing a power level associated with the signals in the transmit chain and controlling the processing responsive to the power level, wherein controlling the processing most preferably includes adjusting the bias of an amplifier in the receive chain.

Preferably, the duplexer attenuates signals entering the receive chain in the transmit frequency band with a third stop-band attenuation, and receiving and processing the signals in the receive chain includes attenuating signals entering the receive chain in the transmit frequency band with a fourth stop-band attenuation approximately equal to or greater than the third stop-band attenuation. Preferably, receiving and processing the signals includes amplifying the signals in at least two amplification stages, and filtering the signals between the amplification stages.

The present invention will be more fully understood from the following detailed description of the preferred embodiments thereof, taken together with the drawings in which:

DETAILED DESCRIPTION OF A PREFERRED EMBODIMENT

Figure 1:
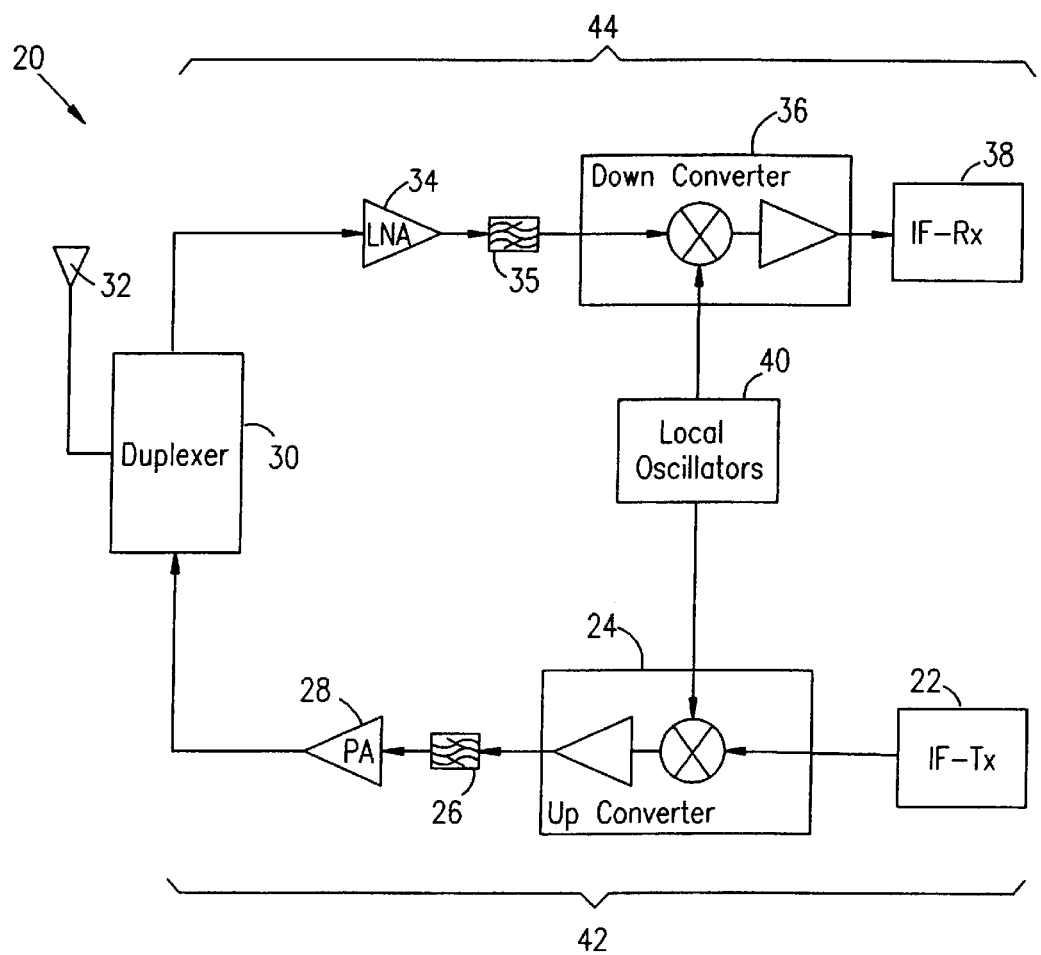
FIG. 1 is a block diagram that schematically illustrates a radio transceiver known in the art.
Figure 2:
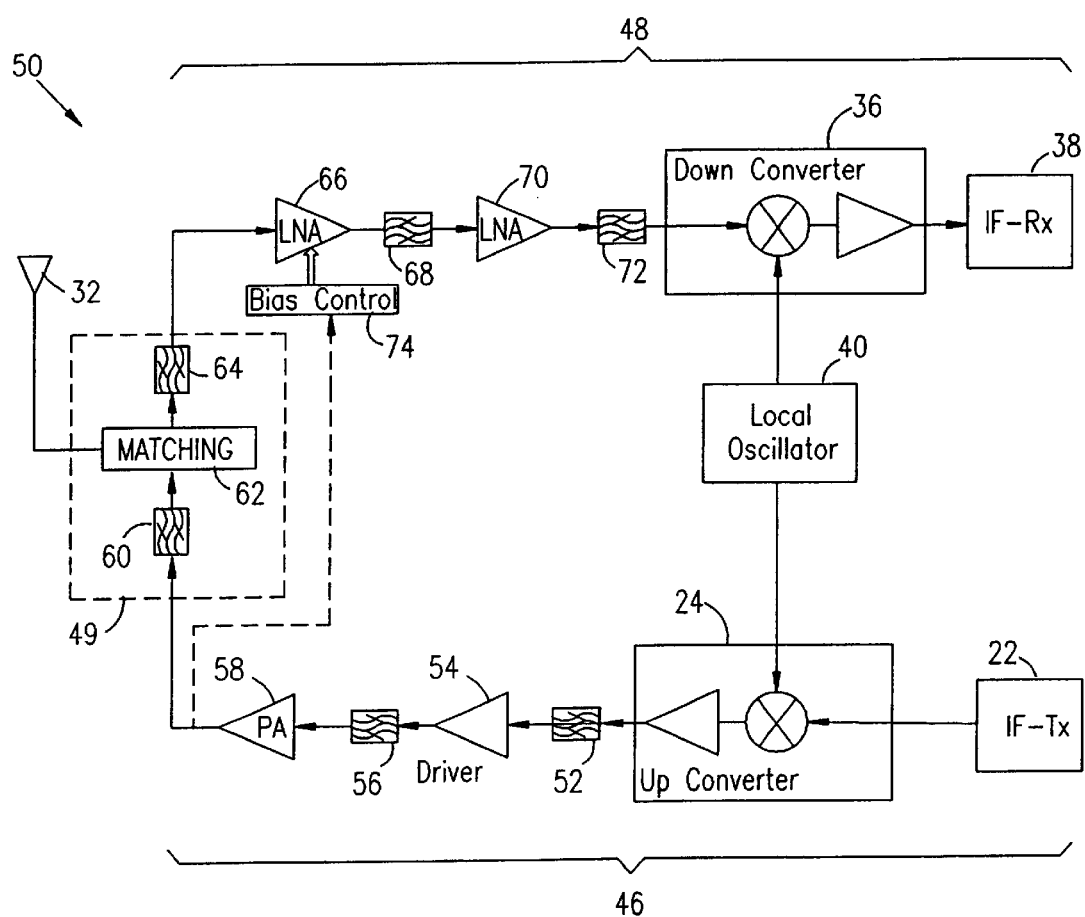
FIG. 2 is a block diagram that schematically illustrates a radio transceiver, in accordance with a preferred embodiment of the present invention.

Reference is now made to FIG. 2, which is a block diagram that schematically illustrates a radio transceiver 50, in accordance with a preferred embodiment of the present invention. Transceiver 50 comprises a Tx chain 46 and a Rx chain 48, coupled to antenna 32 by a duplexing circuit 49. As described hereinbelow, the Tx and Rx chains and duplexing circuit are substantively different from corresponding elements of transceiver 20 (FIG. 1), so that transceiver 50 achieves performance comparable to or better than transceivers known in the art that are much larger and more expensive to produce.

Transceiver 50 is designed, in the present example, to operate in the NMT450 cellular band (Tx: 450–455 MHz, Rx: 460–465 MHz), but can easily be adapted to operate in other cellular bands or in substantially any other radio frequency band. For simplicity, some standard components of the transceiver, such as an isolator in the Tx chain, are omitted from FIG. 2 and/or from the description hereinbelow.

As shown in FIG. 2, duplexing circuit 49 comprises filters 60 and 64, coupled by an optional matching circuit to antenna 32. Alternatively, circuit 49 may be provided as an integral unit, without discrete matching components. The filters preferably comprise SAW filters, as are known in the art, such as high-power SAW filters supplied by TEMEX S.A.W. (S.A.) of Neuchatel, Switzerland. These filters are 5×5×1.3 mm in size, so that duplexing circuit 49 is roughly one fifth the size of conventional duplexer 30. Alternatively, suitable miniature filter components of other types may also be used. The specifications of the duplexing circuit are listed in Tables I–IV hereinbelow, wherein it will be noted that the stop-band attenuation of the circuit, i.e., the degree to which Tx signals and noise in the Rx band generated by Tx chain 46 are rejected by the duplexer, is only 30 db, as opposed to 50 dB required in conventional transceivers.

In order to compensate for the low stop-band attenuation provided by duplexing circuit 49, Tx chain 46 is made of a driver amplifier 54 and a power amplifier 58, with additional filters 52 and 56, preferably SAW filters, between the stages. Since two amplification stages are used, both can be set to relatively low gains by comparison with the single power amplifier 28 used in conventional transceiver 20. SAW filters 52 and 56 provide an additional 25 db each of stop-band attenuation, in addition to the attenuation of the duplexer. Since filter 56 attenuates broadband noise output by amplifier 54 before it is amplified by low-gain amplifier 58, the level of broadband noise reaching the duplexer is substantially reduced relative to the design of transceiver 20 in FIG. 1. Because of its low gain, amplifier 58 also has a lower noise floor than high-gain amplifier 28.

Rx chain 48 is similarly divided into two stages, each stage including a low-gain, low-noise amplifier 66, 70 and a filter 68, 72, preferably a SAW filter. The use of two such stages increases selectivity of the Rx chain, so that less noise passes through the chain to receiver circuit 38. Because of the low gain of amplifier 66, any Tx signal that leaks into the amplifier from duplexing circuit 49 is only moderately amplified, and is then attenuated substantially, preferably by 25 db in each of filters 68 and 72. Furthermore, because amplifiers 66 and 70 are set to relatively low gain levels compared to LNA 34 in transceiver 20, gain compression is avoided even when Tx chain 46 is operating at full power.

To further prevent gain compression at maximum Tx output power, an optional bias control circuit 74 is coupled to sense high output power and increase the bias of amplifier 66 accordingly. The use of bias control in this manner further compensates for the low stop-band rejection of filter 64 in duplexing circuit 49. When the Tx power is at its nominal level, or when transceiver 50 is receiving only, and not transmitting, circuit 74 reduces the bias of the amplifier in order to reduce power consumption.

The following tables list pertinent specifications of the components of transceiver 50:

TABLE I

Tx CHAIN GAIN AND NOISE (dB)

| Element | Gain | Cascade Gain | Noise Figure (NF) |
|---|---|---|---|
| Baseband circuit | 0.00 | 0.00 | 50.00 |
| Low-pass filter | −2.00 | −2.00 | 2.00 |
| Upconverter 24 (mixer) | −5.50 | −7.50 | 5.50 |
| Upconverter 24 (amp.) | 25.00 | 17.50 | 0.00 |
| SAW 52 | −3.00 | 14.50 | 3.00 |
| Driver 54 | 18.00 | 32.50 | 4.00 |
| SAW 56 | −3.00 | 29.50 | 3.00 |
| Power amplifier 58 | 18.00 | 47.50 | 5.00 |
| Isolator | −0.80 | 46.70 | 0.80 |
| Transmission line | −0.10 | 46.60 | 0.10 |
| Duplexer 49 | −3.00 | 43.60 | 3.00 |
| Line loss | −0.10 | 43.50 | 0.10 |
| Antenna 32 | −0.50 | 43.00 | 0.50 |
| Total | 43.00 | 43.00 | |

TABLE II

Rx BAND RESPONSE AND NOISE OF Tx CHAIN (dB)

| Element | Rx Reject | Cascade Gain (Rx Band) | Cascade NF (Rx Band) |
|---|---|---|---|
| Baseband circuit | | 0.0 | 50.00 |
| Low-pass filter | −45.00 | −47.0 | 51.76 |
| Upconverter 24 (mixer) | | −52.5 | 54.44 |
| Upconverter 24 (amp.) | | −27.5 | 54.44 |
| SAW 52 | −25.00 | −55.5 | 58.01 |
| Driver 54 | | −37.5 | 60.68 |
| SAW 56 | −25.00 | −65.5 | 66.73 |
| Power amplifier 58 | −1.00 | −48.5 | 71.84 |
| Isolator | −0.20 | −49.5 | 71.85 |
| Transmission line | | −49.6 | 71.85 |
| Duplexer 49 | −30.00 | −82.6 | 82.95 |
| Line loss | | −82.7 | 83.04 |
| Antenna 32 | | −83.2 | 83.51 |
| Total | −126.20 | Output NF = 0.31 | |

It is thus observed that due to the high Rx band rejection of SAW filters 52 and 56, the total Rx band rejection of Tx chain 46 and duplexing circuit 49 is −126 dB. The output noise figure of the Tx chain in the Rx band, given by the sum of Cascade Gain and Cascade Noise Figure, is only about 0.3 dB above the thermal noise floor.

TABLE III

Rx CHAIN GAIN AND NOISE (dB)

| Element | Gain | Cascade Gain | Noise Figure |
|---|---|---|---|
| Line loss | −0.50 | −0.50 | 0.50 |
| Duplexer 49 | −3.00 | −3.50 | 3.00 |
| LNA 66 | 8.00 | 4.50 | 2.40 |
| SAW 68 | −3.00 | 1.50 | 3.00 |
| LNA 70 | 12.00 | 13.50 | 0.00 |
| SAW 72 | −3.00 | 10.50 | 3.00 |
| Mixer | −5.50 | 5.00 | 5.50 |
| First IF amplifier | 10.00 | 15.00 | 2.00 |
| SAW filter | −11.00 | 4.00 | 10.00 |
| Second IF amplifier | 10.00 | 14.00 | 1.50 |
| Baseband Rx circuit | 66.00 | 80.00 | 10.00 |
| Total | 80.00 | 80.00 | |

TABLE IV

Tx BAND RESPONSE AND NOISE OF Rx CHAIN (dB)

| Element | Tx Reject | Cascade Gain (Tx Band) | Cascade NF |
|---|---|---|---|
| Input | | | 0.31 |
| Line loss | | −0.5 | 0.77 |
| Duplexer 49 | −30.00 | −33.5 | 3.64 |
| LNA 66 | | −25.5 | 5.98 |
| SAW 68 | −25.00 | −53.5 | 6.35 |
| LNA 70 | | −41.5 | 6.35 |
| SAW 72 | −25.00 | −69.5 | 6.40 |
| Mixer | | −75.0 | 6.62 |
| First IF amplifier | | −65.0 | 6.79 |
| SAW filter | | −76.0 | 7.04 |
| Second IF amplifier | | −66.0 | 7.18 |
| Baseband Rx circuit | | | 7.47 |
| Total | −80.00 | | 7.47 |

The values in the tables compare favorably with those of conventional transceivers, such as transceiver 20, based on full-performance duplexers, which typically have a Rx cascade noise figure of about 10 dB.

Figure 3:
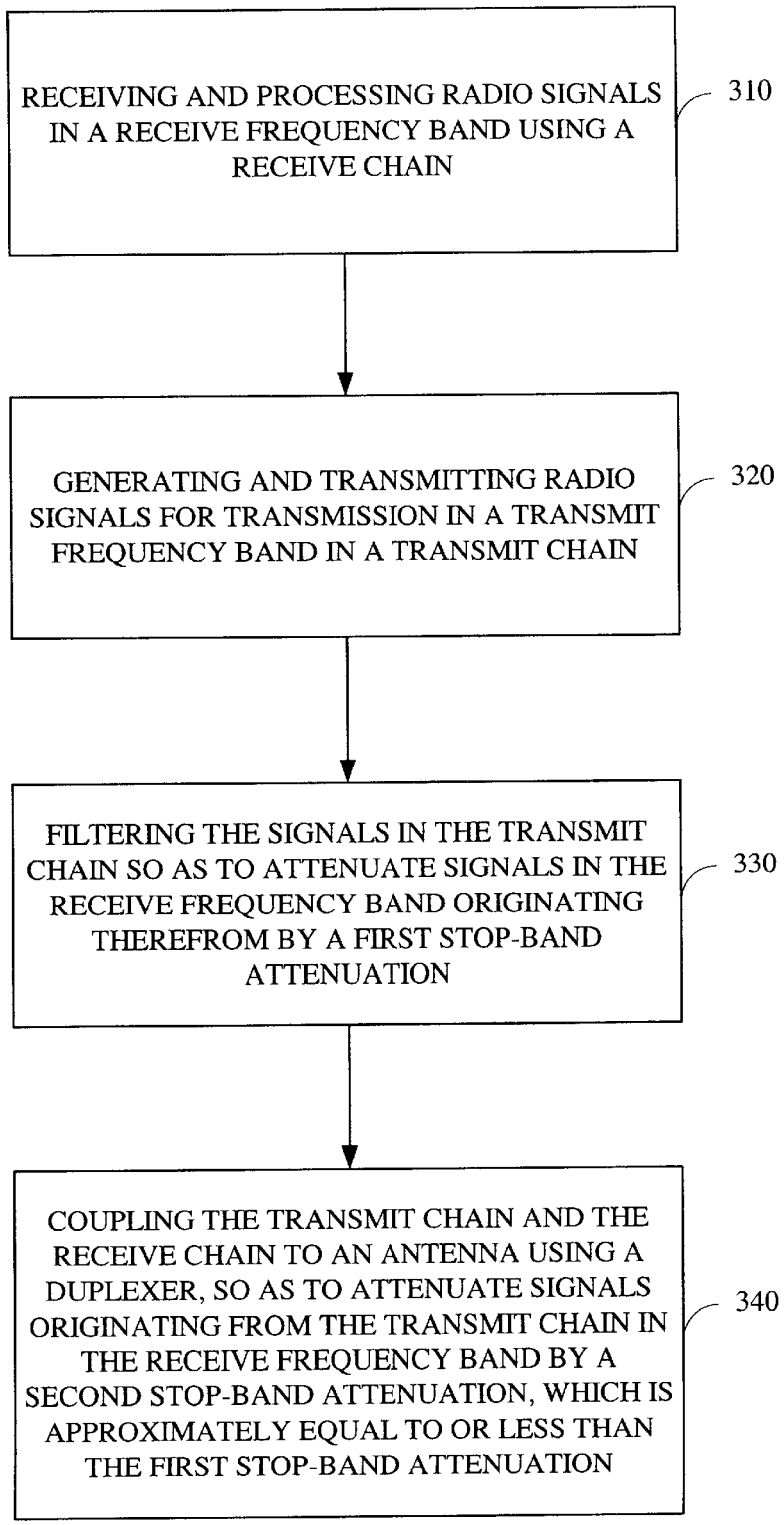

There is moreover provided, in accordance with a preferred embodiment of the present invention, a method as shown in FIG. 3 for transmitting and receiving radio signals in a full-duplex mode, including: receiving and processing radio signals in a receive frequency band using a receive chain 310; generating and transmitting radio signals for transmission in a transmit frequency band in a transmit chain 320; filtering the signals in the transmit chain so as to attenuate signals in the receive frequency band originating therefrom by a first stop-band attenuation 330; and coupling the transmit chain and the receive chain to an antenna using a duplexer, so as to attenuate signals originating from the transmit chain in the receive frequency band by a second stop-band attenuation, which is approximately equal to or less than the first stop-band attenuation 340.

Thus, although transceiver 50 includes a greater number of components than conventional transceiver 20, the small size and low cost of the components used in transceiver 50 result in a smaller overall size and far lower cost of the transceiver. It will be appreciated that the specific circuit design and choice of components described hereinabove and the values listed in the tables are cited only by way of example. The full scope of the invention is limited only by the claims.

What is claimed is:

1. A duplex radio transceiver, coupled to baseband circuitry and to an antenna, which comprises:
   a receive chain, which receives and processes radio signals in a receive frequency band and conveys the processed signals to the baseband circuitry, the chain comprising one or more amplifiers and one or more filter components;
   a transmit chain, which generates radio signals for transmission in a transmit frequency band, the chain comprising one or more amplifiers and one or more filter components, which attenuate signals originating from the transmit chain in the receive frequency band by a first stop-band attenuation; and
   a duplexer, which couples the transmit chain and the receive chain to the antenna, and which attenuates signals originating from the transmit chain in the receive frequency band by a second stop-band attenuation, which is approximately equal to or less than the first stop-band attenuation.

2. A transceiver according to claim 1, wherein the duplexer and the one or more filter components in the receive and transmit chains comprise surface acoustic wave devices.

3. A transceiver according to claim 1, wherein the one or more amplifiers in the transmit chain comprise at least two amplifiers, with at least one of the filter components disposed therebetween.

4. A transceiver according to claim 3, wherein the transmit chain comprises:
   a first filter, which receives and filters signals from an upconverter coupled to the baseband circuitry;
   a driver amplifier, which receives and amplifies the signals from the first filter;
   a second filter, which receives and filters the signals from the driver amplifier; and
   a power amplifier, which receives and amplifies the signals from the second filter, which amplified signals are conveyed to the duplexer.

5. A transceiver according to claim 4, wherein the power amplifier has a gain approximately equal to or less than 20 dB.

6. A transceiver according to claim 1, and comprising a bias control circuit, which senses a power level associated with the radio signals for transmission and adjusts at least one of the amplifiers in the receive chain responsive to the power level.

7. A transceiver according to claim 1, wherein the duplexer attenuates signals entering the receive chain in the transmit frequency band with a third stop-band attenuation, and wherein the receive chain attenuates the signals in the transmit frequency band with a fourth stop-band attenuation approximately equal to or greater than the third stop-band attenuation.

8. A duplex radio transceiver, coupled to baseband circuitry and to an antenna, which comprises:
   a transmit chain, which generates radio signals for transmission in a transmit frequency band;
   a receive chain, which receives and processes radio signals in a receive frequency band and conveys the processed signals to the baseband circuitry, the chain comprising one or more amplifiers and one or more filter components which attenuate signals in the transmit frequency band by a first stop-band attenuation; and
   a duplexer, which couples the transmit chain and the receive chain to the antenna, and which attenuates signals entering the receive chain in the transmit frequency band by a second stop-band attenuation, which is approximately equal to or less than the first stop-band attenuation.

9. A transceiver according to claim 8, wherein the one or more amplifiers in the receive chain comprise at least two amplifiers, with at least one of the filter components disposed therebetween.

10. A transceiver according to claim 9, wherein the receive chain comprises:
    a first low-noise amplifier, which receives and amplifies signals conveyed from the duplexer;
    a first filter, which receives and filters the signals from the first low-noise amplifier;
    a second low-noise amplifier, which receives and amplifies the signals from the first filter; and
    a second filter, which receives and filters the signals from the second low-noise amplifier.

11. A transceiver according to claim 10, wherein the first low-noise amplifier has a gain approximately equal to or less than 10 dB.

12. A transceiver according to claim 8, and comprising a bias control circuit, which senses a power level associated with the radio signals for transmission and adjusts at least one of the amplifiers in the receive chain responsive to the power level.

13. A method for transmitting and receiving radio signals in a full-duplex mode, comprising:
    receiving and processing radio signals in a receive frequency band using a receive chain;
    generating and transmitting radio signals for transmission in a transmit frequency band in a transmit chain;
    filtering the signals in the transmit chain so as to attenuate signals in the receive frequency band originating therefrom by a first stop-band attenuation; and
    coupling the transmit chain and the receive chain to an antenna using a duplexer, so as to attenuate signals originating from the transmit chain in the receive frequency band by a second stop-band attenuation, which is approximately equal to or less than the first stop-band attenuation.

14. A method according to claim 13, wherein receiving and processing the radio signals comprises sensing a power level associated with the signals in the transmit chain and controlling the processing responsive to the power level.

15. A method according to claim 14, wherein controlling the processing comprises adjusting the bias of an amplifier in the receive chain.

16. A method according to claim 13, wherein the duplexer attenuates signals entering the receive chain in the transmit frequency band with a third stop-band attenuation, and wherein receiving and processing the signals in the receive chain comprises attenuating signals entering the receive chain in the transmit frequency band with a fourth stop-band attenuation approximately equal to or greater than the third stop-band attenuation.

17. A method according to claim 16, wherein receiving and processing the signals comprises amplifying the signals in at least two amplification stages, and filtering the signals between the amplification stages.

18. A duplex radio transceiver, coupled to baseband circuitry and to an antenna, which comprises:

a receive chain, which receives and processes radio signals in a receive frequency band and conveys the processed signals to the baseband circuitry, the chain comprising at least two amplification stages and two filtering stages;

a transmit chain, which generates radio signals for transmission in a transmit frequency band, the chain comprising at least two amplification stages and two filtering stages configured to attenuate signals originating from the transmit chain in the receive frequency band; and a duplexer, which couples the transmit chain and the receive chain to the antenna.

19. A duplex radio transceiver, coupled to baseband circuitry and to an antenna, which comprises:

a transmit chain, which generates radio signals for transmission in a transmit frequency band;

a receive chain, which receives and processes radio signals in a receive frequency band and conveys the processed signals to the baseband circuitry, the chain comprising at least two amplification stages and two filtering stages configured to attenuate signals in the transmit frequency band; and a duplexer, which couples the transmit chain and the receive chain to the antenna.

* * * * *

UNITED STATES PATENT AND TRADEMARK OFFICE
CERTIFICATE OF CORRECTION

PATENT NO.         : 6,795,690 B2
APPLICATION NO. : 09/417831
DATED              : September 21, 2004
INVENTOR(S)        : Weissman et al.

It is certified that error appears in the above-identified patent and that said Letters Patent is hereby corrected as shown below:

On Title Page, Item (75) should read,

Line 4, replace "Yonah" with --Yona--.

Signed and Sealed this

Twenty-seventh Day of March, 2007

JON W. DUDAS
*Director of the United States Patent and Trademark Office*